US007741556B2

(12) United States Patent
Demsey et al.

(10) Patent No.: US 7,741,556 B2
(45) Date of Patent: Jun. 22, 2010

(54) METHODS AND SYSTEMS FOR INTERFACING AN ELECTRIC STRINGED MUSICAL INSTRUMENT TO AN ELECTRONIC DEVICE

(75) Inventors: Seth Mitchell Demsey, Seattle, WA (US); Thomas George Lorimor, Seattle, WA (US)

(73) Assignee: Zero Crossing Inc, Redmond, WA (US)

( * ) Notice: Subject to any disclaimer, the term of this patent is extended or adjusted under 35 U.S.C. 154(b) by 834 days.

(21) Appl. No.: 11/651,646

(22) Filed: Jan. 10, 2007

(65) Prior Publication Data

US 2008/0163736 A1 Jul. 10, 2008

(51) Int. Cl.
*G10D 1/08* (2006.01)
*H02G 3/04* (2006.01)

(52) U.S. Cl. .......................... 84/743; 84/267; 84/600; 174/68.1

(58) Field of Classification Search .................... 84/743
See application file for complete search history.

(56) References Cited

U.S. PATENT DOCUMENTS

| | | | | |
|---|---|---|---|---|
| 4,519,287 | A * | 5/1985 | Naruse | 84/743 |
| 7,241,948 | B2 * | 7/2007 | Cummings | 84/731 |
| 2003/0159570 | A1 * | 8/2003 | Toshitani | 84/645 |
| 2003/0169377 | A1 | 9/2003 | Kulas | |
| 2004/0144241 | A1 * | 7/2004 | Juskiewicz et al. | 84/723 |
| 2004/0175993 | A1 | 9/2004 | Chennakeshu | |
| 2004/0187673 | A1 * | 9/2004 | Stevenson | 84/737 |
| 2004/0206226 | A1 | 10/2004 | Negoescu et al. | |
| 2006/0048635 | A1 * | 3/2006 | Campbell | 84/742 |

OTHER PUBLICATIONS

"iGuitar.USB, Quick Start Guide", www.brianmooreguitars.com—info@brianmooreguitars.com, Sep. 29, 2006.
"Plug n' Play Rock", http://www.behringer.com/IAXE393/infrc.cfm?lang=ENG, Dec. 4, 2006.

* cited by examiner

*Primary Examiner*—Jeffrey Donels
*Assistant Examiner*—Christopher Uhlir
(74) *Attorney, Agent, or Firm*—Olympic Patent Works PLLC

(57) ABSTRACT

Various embodiments of the present invention are directed to an electronic-device interface integrated into an electric stringed musical instrument. The electronic-device interface can be used for interconnecting an electric stringed musical instrument to an electronic device. In one embodiment of the present invention, an electronic-device interface includes a universal-serial-bus interface, a tip-ring-ring-sleeve output jack, and an enhanced electric-stringed-musical-instrument cable with a tip-ring-ring-sleeve connection at a first end and a universal-serial-bus connection at a second end. When an electric stringed musical instrument is equipped with an electronic-device interface, a user may insert the first end of the enhanced electric-stringed-musical-instrument cable into the tip-ring-ring-sleeve output jack and the second end of the enhanced electric-stringed-musical-instrument cable into a universal-serial-bus port for an electronic device. The user may then input music to the electronic device by playing music on the electric stringed musical instrument.

27 Claims, 10 Drawing Sheets

METHODS AND SYSTEMS FOR INTERFACING AN ELECTRIC STRINGED MUSICAL INSTRUMENT TO AN ELECTRONIC DEVICE

TECHNICAL FIELD

The present invention relates to the field of electric stringed musical instruments, and, in particular, to methods and systems for interfacing an electric stringed musical instrument to an electronic device.

BACKGROUND OF THE INVENTION

Stringed musical instruments form the backbone of popular music in many countries around the world. For many decades, electric versions of stringed musical instruments ("electric instruments") have been a popular alternative to their acoustic counterparts. Various methods are currently available for electric-instrument players ("users") to change the character of the sound produced by an electric instrument, such as by using effects pedals. Various methods are also available to merge music played on an electric instrument with other music and to make sound recordings of music played on an electric instrument, such as by using mixing boards and sound-recording devices. Effects pedals, mixing boards, sound recording devices, and other electric-instrument-related items can be expensive to buy and take up large amounts of space. Consequently, some people opt to use software and/or hardware installed on an electronic device, such as a computer, that can function as one or more virtual effect pedals, a virtual mixing board, a sound recorder, and/or other sound-augmenting and/or sound-managing devices.

Utilizing software and/or hardware installed on an electronic device may reduce cost and clutter, and increase convenience. However, interconnecting an electric instrument to an electronic device can be problematic. Although a number of different methods exist for interconnecting an electric instrument to an electronic device, some methods create a relatively-low quality of sound, and some methods rely on the addition of a number of intervening devices for proper functioning that may be expensive to purchase and inconvenient to set-up and operate. For example, in a first method for interconnecting an electric instrument to an electronic device, an electric instrument is interconnected to a sound card on an electronic device via a one-eighth-inch adaptor plug inserted into a mic-in input for an electronic device. The sound quality produced using the first method may be relatively low because the impedance of mic-in inputs is generally lower than a typical impedance level needed by an electric instrument. Alternatively, in a second method, a one-eighth-inch adaptor plug, interconnected to an electric instrument, is inserted into a line-in input for an electronic device. Although the line-in input may have a high enough impedance to increase the sound quality compared to the first method, a pre-amp may be needed to increase an input signal to a level high enough to be usable by an electronic device. In a third method, an electric instrument is connected to a universal serial bus ("USB") interface that, in turn, is connected to a USB port for an electronic device. In a fourth method, an electric instrument is connected to an amplifier, and the amplifier, in turn, is interconnected to a microphone. The microphone is then connected to a one-eighth-inch adaptor which is inserted into a mic-in input for an electronic device. Alternately, in a fifth method, an electric instrument in connected to an amplifier and the amplifier, in turn, is interconnected to a microphone. The microphone is then connected to a pre-amp, which is connected to a one-eighth-inch adaptor which, in turn, is inserted into a line-in input for an electronic device. In a sixth method, an electric instrument in connected to an amplifier and the amplifier, in turn, is interconnected a microphone. The microphone is then connected to a USB interface which, in turn, is connected to a USB port for an electronic device. In a seventh method, an electric instrument in connected to an amplifier and the amplifier, in turn, is connected to a one-eighth-inch adaptor which, in turn, is inserted into a line-in input for an electronic device.

Each of the above-listed methods of interconnecting an electric instrument to an electronic device either produces a relatively low-quality signal or utilizes a number of expensive and cumbersome intervening electronic devices, such as pre-amps, amplifiers, microphones, and/or USB interfaces. Stringed-musical-instrument players, as well as people that enjoy listening to stringed musical instruments have, therefore, recognized a need for an easy, cost-effective way to interconnect an electric instrument to an electronic device without relying on a number of intervening devices for increasing the quality of the sound input to the electronic device to a level that is high enough to create, merge, and/or manage sound recordings.

SUMMARY OF THE INVENTION

Various embodiments of the present invention are directed to an electronic-device interface integrated into an electric stringed musical instrument. The electronic-device interface can be used for interconnecting an electric stringed musical instrument to an electronic device. In one embodiment of the present invention, an electronic-device interface includes a universal-serial-bus interface, a tip-ring-ring-sleeve output jack, and an enhanced electric-stringed-musical-instrument cable with a tip-ring-ring-sleeve connection at a first end and a universal-serial-bus connection at a second end. When an electric stringed musical instrument is equipped with an electronic-device interface, a user may insert the first end of the enhanced electric-stringed-musical-instrument cable into the tip-ring-ring-sleeve output jack and the second end of the enhanced electric-stringed-musical-instrument cable into a universal-serial-bus port for an electronic device. The user may then input music to the electronic device by playing music on the electric stringed musical instrument.

DETAILED DESCRIPTION OF THE INVENTION

Figure 1:
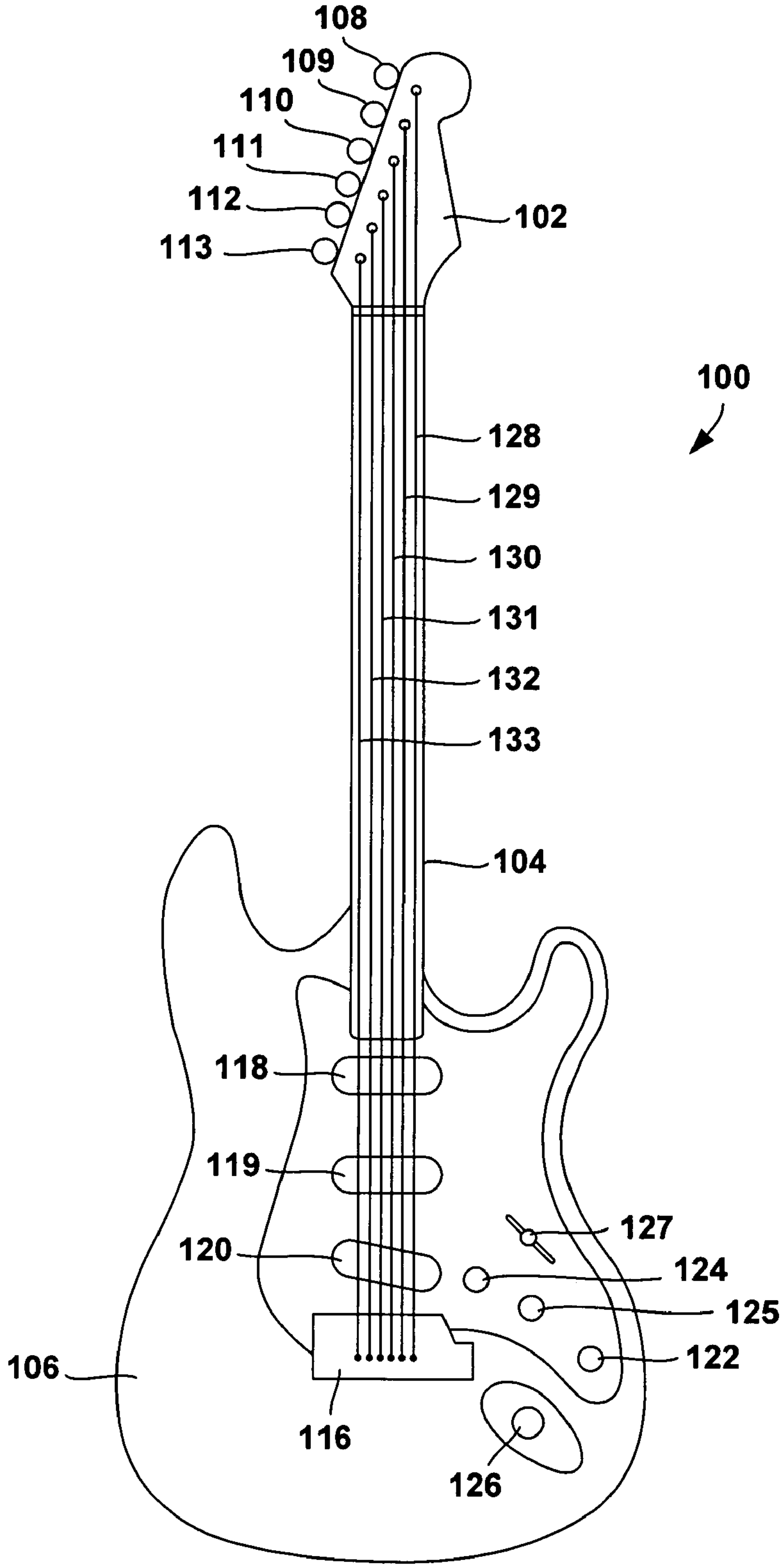
FIG. 1 shows a front view of an electric guitar.

Various embodiments of the present invention are directed to an electronic-device interface integrated into an electric stringed musical instrument. The electronic-device interface can be used to interconnect an electric stringed musical instrument to an electronic device. For clarity, the electronic-device interface is described below as being integrated into an electric guitar. However, the electronic-device interface can similarly be integrated into other electric instruments, including electric basses, electric violins, electric banjos, electric mandolins, and other electric instruments. FIG. 1 shows a front view of an electric guitar. An electric guitar 100 includes a headstock 102, a neck 104, and a body 106. The headstock 102 contains six tuning pegs 108-113. The body 106 contains a bridge 116, three pick-ups 118-120, a volume knob 122, two tone knobs 124 and 125, an output jack 126, and a pick-up selector 127. Six metallic strings 128-133 extend from the bridge 116 to the six tuning pegs 108-113, respectively.

When a user plays the electric guitar 100, the user creates a vibration along one or more of the strings 128-133 by plucking, raking, picking, hammering, tapping, slapping, or strumming ("playing") one or more of the strings 128-133 with a first hand while pressing a number of the played strings against the neck 104 at various locations with a second hand. The location along the neck 104 of the second hand pressing down on a given played string determines the frequency of the vibrations produced by that string. The character of the sound eventually output by the electric guitar 100 may be influenced by the way each of the strings 128-133 is played. Additionally, the volume and the timbre of the sound may be influenced by adjusting the volume knob 122 and the tone knobs 124 and 125, respectively.

The six strings 128-133 pass over the three pickups 118-120. Each pick-up 118-120 contains a number of magnets wrapped in wire. The vibrations of an overlying metallic string cause a signal to be induced in one or more of the wires wrapped around one or more of the magnets. The signal passes along an electric-guitar circuit from one or more of the pickups 118-120 to the output jack 126. An electric-instrument cable (not shown in FIG. 1) can be input to the output jack 126 and connected to other devices, such as an amplifier. Note that different types of electric guitars can have different numbers of pick-ups, volume knobs, tone knobs, and other features. For example, a first electric guitar may have one pick-up and a second electric guitar may have four pick-ups. A third electric guitar may have a separate volume knob for each pick-up selector and a fourth electric guitar may not have any tone knobs.

Figure 2:
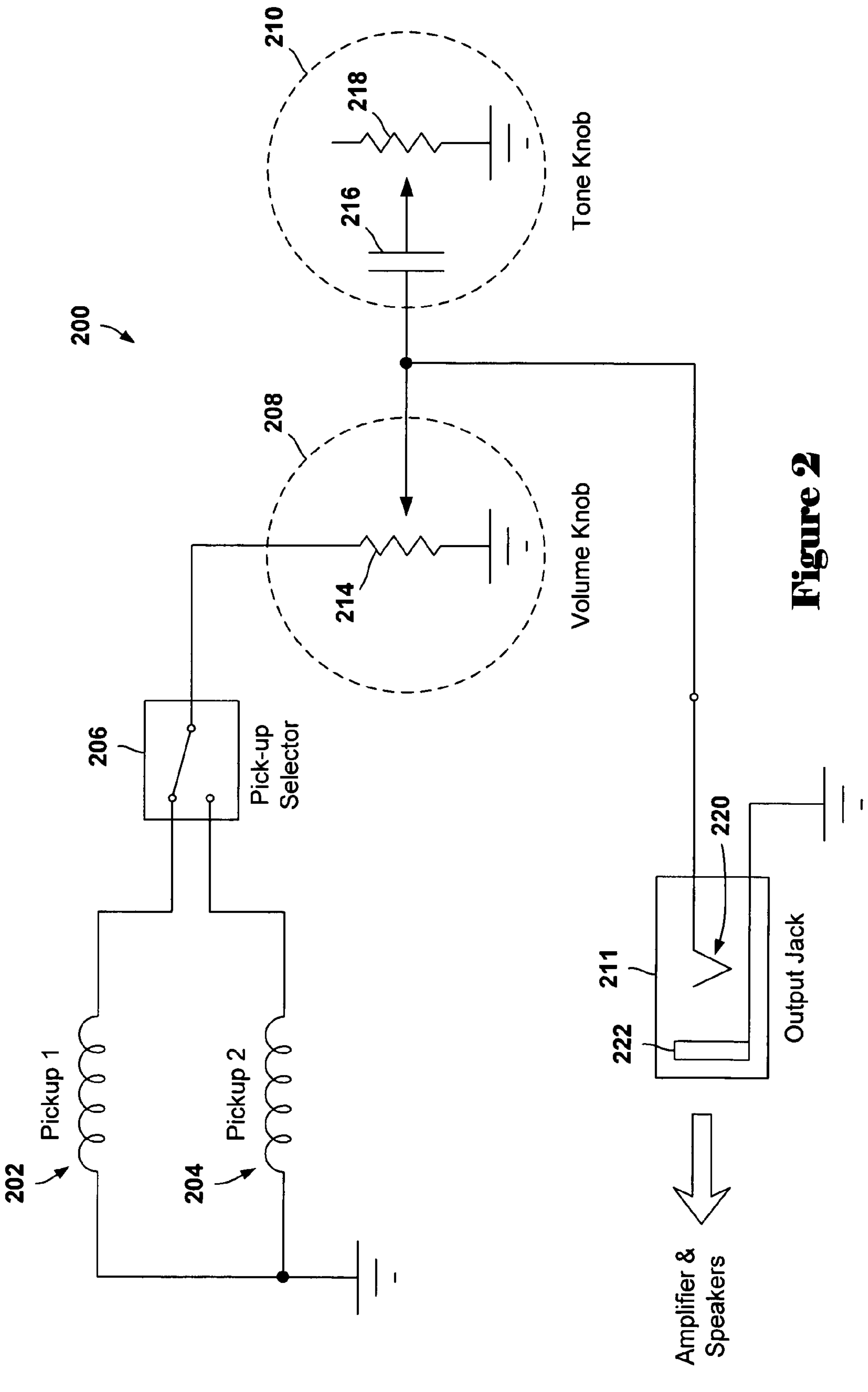
FIG. 2 shows a schematic diagram of an exemplary electric-guitar circuit.

FIG. 2 shows a schematic diagram of an exemplary electric-guitar circuit. An electric-guitar circuit 200 includes a first pick-up coil 202, a second pick-up coil 204, a pick-up selector 206, a volume adjuster 208, a tone adjuster 210, and an output jack 212. The pick-up selector 206 allows a user to select to receive a signal from one of the available pick-ups of an electric guitar. In FIG. 2, "Pickup 1" has been selected. In FIG. 2, the volume adjuster 208 and the tone adjuster 210 are shown as dashed circles surrounding various associated electrical components. The volume adjuster 208 includes one or more adjustable volume resistors 214. The tone adjuster 210 includes a band-pass filter comprised of one or more capacitors 216 and one or more adjustable tone resistors 218. The volume adjuster 208 and the tone adjuster 210 can be user-controlled by a number of different means, such as by knobs interconnected to one or more potentiometers. The output jack 126 includes a tip connection 220 that connects an inserted electric-instrument cable (not shown in FIG. 2) to the electric-guitar circuit 300, and a sleeve connection 222 that functions as a ground.

A vibrating string in the proximity of a selected pick-up coil 202 and 204 causes an induced signal in the selected pick-up coil 202 and 204. The induced signal transmits through the volume adjuster 208 ("volume knob") and the tone adjuster 210 ("tone knob") before reaching the output jack 212. A user can use the volume knob 208 and/or the tone knob 210 to adjust the character of the sound. Additional knobs and controllers can be interconnected to the electric-guitar circuit shown in FIG. 2, including additional volume knobs and additional tones knobs.

Figure 3:
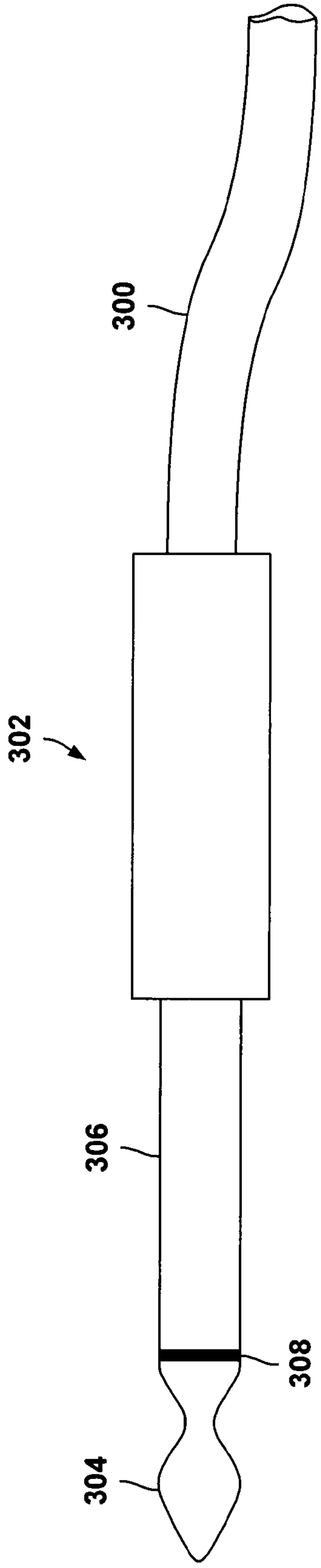
FIG. 3 shows an exemplary tip-sleeve electric-instrument cable for inserting into an output jack for an electric guitar.

FIG. 3 shows an exemplary tip-sleeve electric-instrument cable for inserting into an output jack for an electric guitar. In FIG. 3, an electric-instrument cable 300 is shown with a tip-sleeve ("TS") connection 302 at one end. The TS connection 302 includes a tip 304 and a sleeve 306 separated by an insulator ring 308. A signal transmitting along an electric-guitar circuit is output at a tip connection, such as the tip connection 220 in the electric-guitar circuit shown in FIG. 2. The signal output from a tip connection transmits along the tip 304 of the TS connection 302. A sleeve connection in an output jack, such as the sleeve connection 222 in the electric-guitar circuit shown in FIG. 2, connects to the sleeve 306 of the TS connection 302 and functions as a ground. TS electric-instrument cables are commonly one-quarter-inch gauge.

Figure 4:
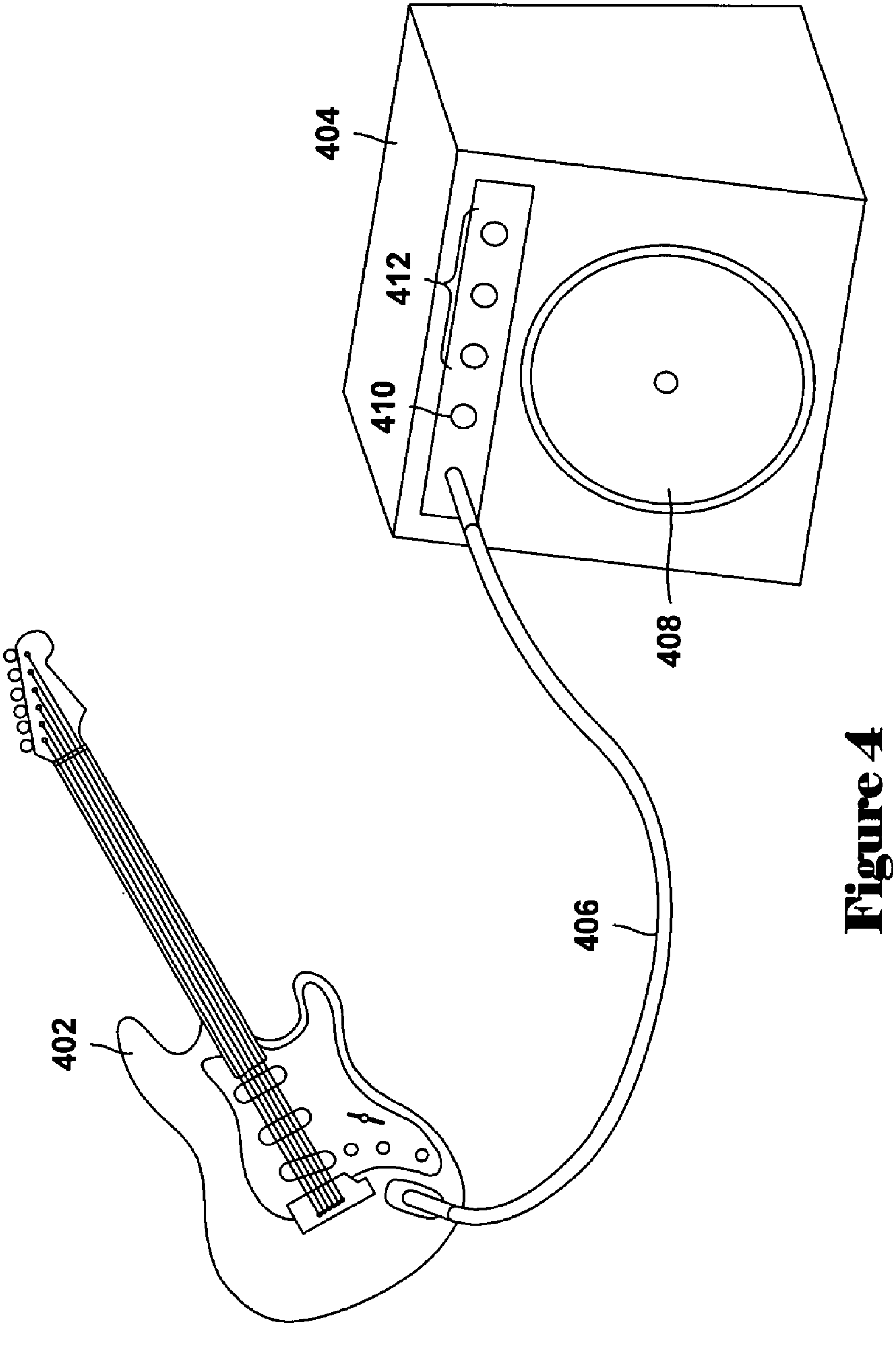
FIG. 4 shows an exemplary electric guitar interconnected to an amplifier.

FIG. 4 shows an exemplary electric guitar interconnected to an amplifier. In FIG. 4, an electric guitar 402 is interconnected to an amplifier 404 via an electric-instrument cable 406. When the electric guitar 402 is interconnected to the amplifier 404, signals output from an electric-guitar circuit are passed through the output jack (126 in FIG. 1) and into the electric-instrument cable 406. Signals in the electric-instrument cable 406, in turn, are output from the electric-instrument cable 406 to the amplifier 404. The amplifier 404 amplifies input signals and outputs audible sounds from one or more interconnected speakers 408. The amplifier 404 may also provide various means to alter the character of the sound eventually output from the one or more speakers 408, such as one or more volume knobs 410 and one or more tone knobs 412. The character of the sound eventually output from the one or more speakers 408 may also be influenced by passing a signal through additional devices prior to passing the signal to the amplifier 404. For example, a signal can be passed through one or more intervening effects pedals.

Figure 5:
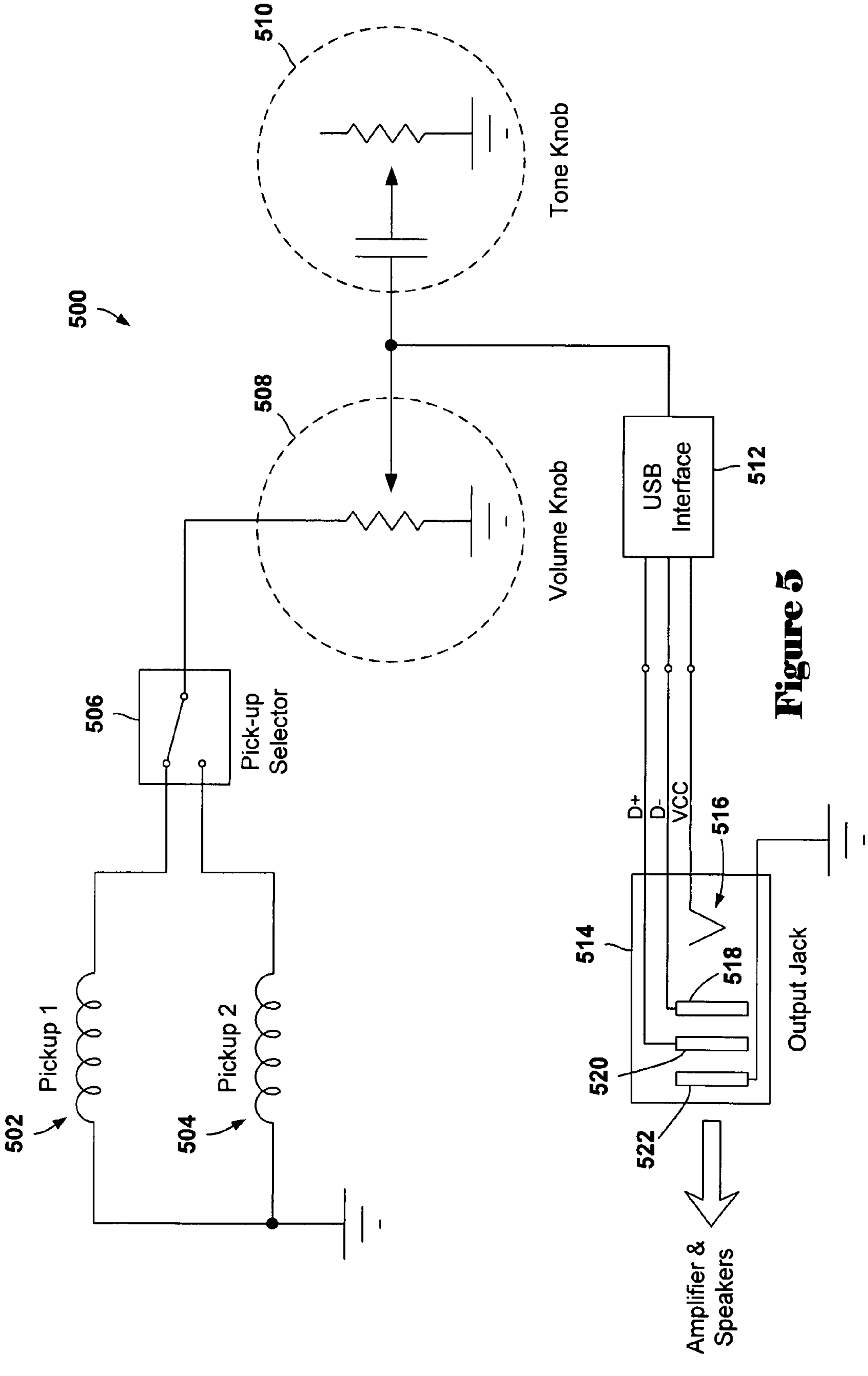
FIG. 5 shows a schematic diagram of an electric-guitar circuit with a USB interface and a tip-ring-ring-sleeve output jack that represents one embodiment of the present invention.

Various embodiments of the present invention are directed to an electronic-device interface integrated into an electric stringed musical instrument. In one embodiment of the present invention, an electronic-device interface includes a universal-serial-bus interface, a tip-ring-ring-sleeve output jack, and an enhanced electric-stringed-musical-instrument cable with a TRRS connection at a first end and a USB connection at a second end. FIG. 5 shows a schematic diagram of an electric-guitar circuit with a USB interface and a tip-ring-ring-sleeve output jack that represents one embodiment of the present invention. In FIG. 5, an electric-guitar circuit 500 is shown that includes a first pick-up coil 502, a second pick-up coil 504, a pick-up selector 506, a volume adjuster 508, a tone adjuster 510, a USB interface 512, and a tip-ring-ring-sleeve ("TRRS") output jack 514. The USB interface 512 converts an input analog signal from the pick-up selector 506 to a digital signal suitable for input to a USB port for an electronic device.

The TRRS output jack 514 includes a tip connection 516, a first ring connection 518, a second ring connection 520, and a sleeve connection 522. The TRRS output jack 514 is sized to receive one-quarter-inch-gauge electric-instrument cables. Thus, the TRRS output jack can be mated with an electric-instrument cable that is equipped with either a TS connection, as described above with reference to FIG. 3, or an enhanced electric-stringed-musical-instrument cable with a TRRS connection at a first end, as described below with reference to FIG. 6A. When an enhanced electric-stringed-musical-instrument cable with a TRRS connection at a first end is inserted into the TRRS output jack 514, signals output from an electric guitar can be input directly to an electronic device. When an electric-instrument cable with a TS connection is inserted into the TRRS output jack 514, the tip connection 516 interconnects the electric-guitar circuit 500 to the tip of the TS electric-guitar cable. The first ring connection 518, the second ring connection 520, and the sleeve connection 522 each connect to the sleeve of the TS electric-instrument cable and collectively function as a ground. Thus, when the TS electric-instrument cable is connected at a second end to an amplifier, effect pedal, or other device that accepts signals from electric guitars transmitting along TS electric-guitar cables, the output signals from the electric-guitar circuit behave in a manner similar to signals output from an electric-guitar circuit with a TS output jack.

Figure 6A:
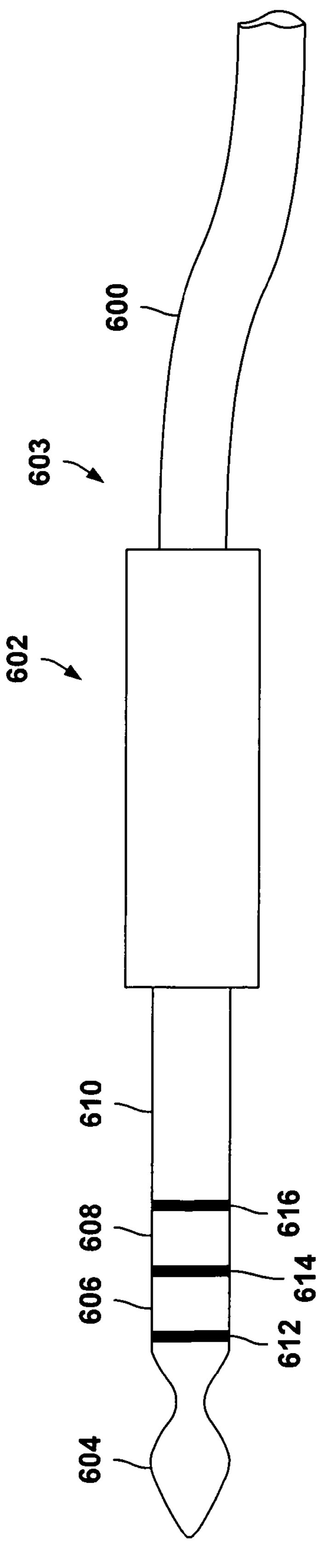
FIG. 6A shows a TRRS connection on a first end of an enhanced electric-instrument cable that represents one embodiment of the present invention.
Figure 6B:
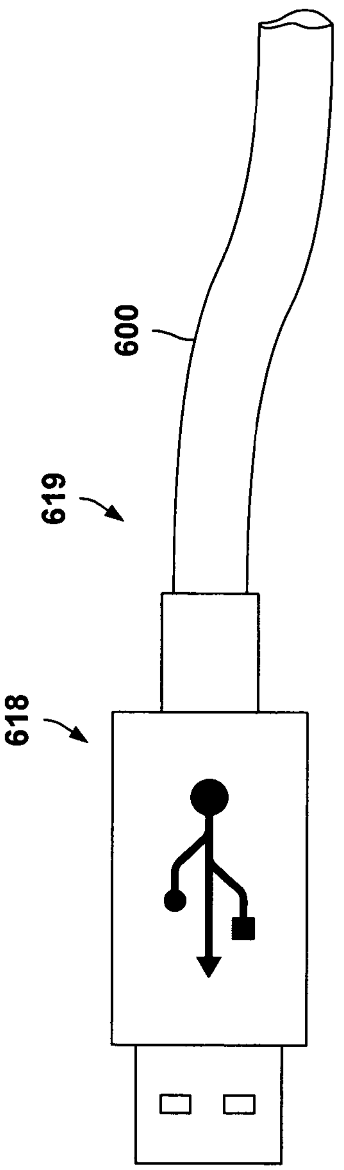
FIG. 6B shows a USB connection on a second end of the enhanced electric-instrument cable shown in FIG. 6A that represents one embodiment of the present invention.

FIG. 6A shows a TRRS connection on a first end of an enhanced electric-instrument cable that represents one embodiment of the present invention. In FIG. 6A, an enhanced electric-instrument cable 600 is shown with a TRRS connection 602 at a first end 603. The TRRS connection 602 includes a tip 604, a first ring 606, a second ring 608, and a sleeve 610. The tip 604 and the first ring 606 are separated by a first insulator ring 612. The first ring 606 and the second ring 608 are separated by a second insulator ring 614. The second ring 608 and the sleeve 610 are separated by a third insulator ring 616. FIG. 6B shows a USB connection on a second end of the enhanced electric-instrument cable shown in FIG. 6A that represents one embodiment of the present invention. In FIG. 6B, the enhanced electric-instrument cable 600 is shown with a USB connection 618 at a second end 619. Some electronic devices contain other types of USB ports, such as mini-USB ports. In alternate embodiments of the present invention, a mini-USB connection, or other type of USB connection, is positioned on the second end 619 of the enhanced electric-instrument cable 600. In FIGS. 6A and 6B, the enhanced electric-instrument cable 600 is one-quarter-inch gauge so that it can be used interchangeably with standard one-quarter-inch electric-instrument cables with TS connections.

Figure 7:
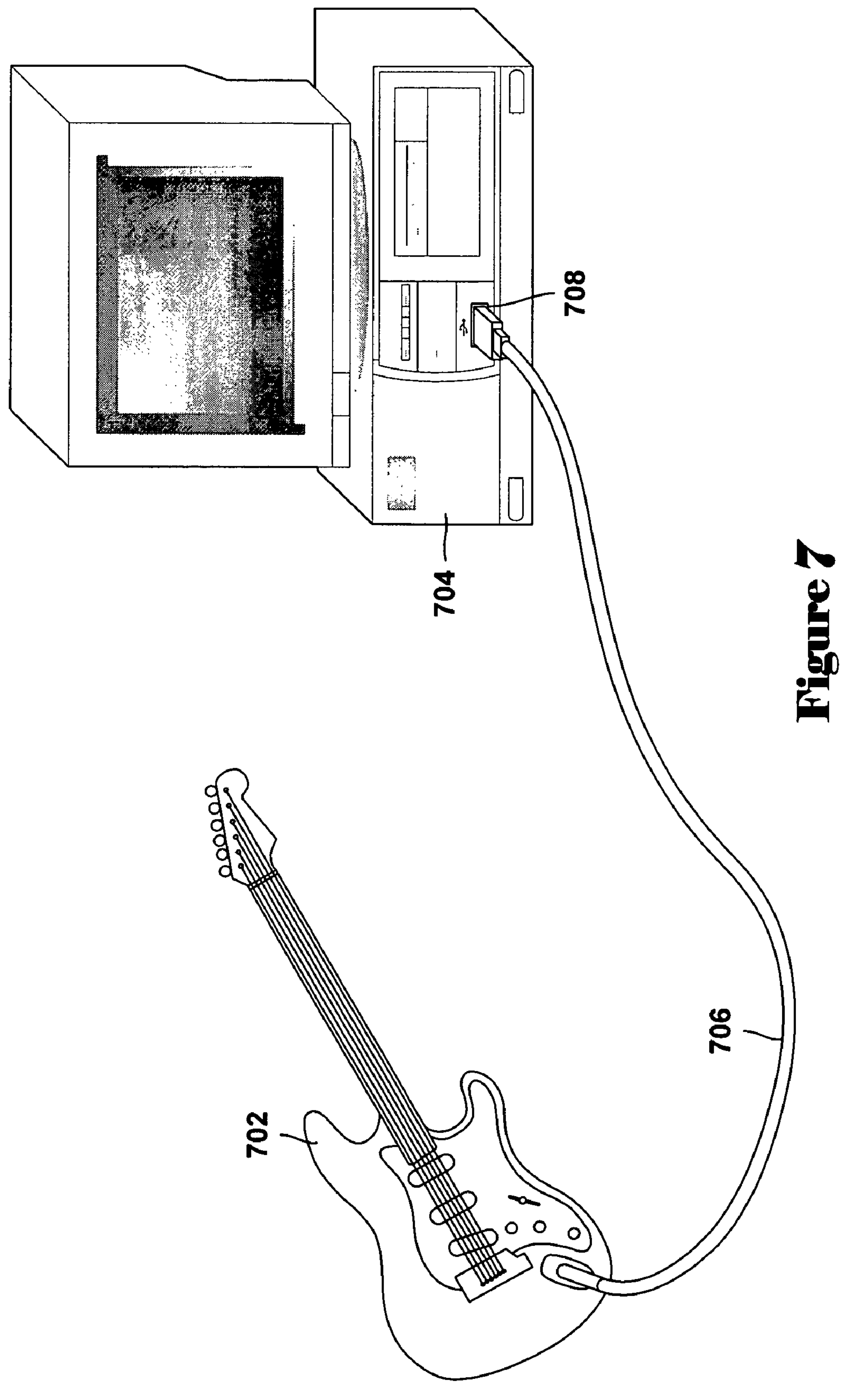
FIG. 7 shows an electric guitar equipped with an electronic-device interface and interconnected to a computer using an enhanced electric-instrument cable that represents one embodiment of the present invention.

An electronic-device interface may be used to connect an electric instrument to an electronic device without the need for additional signal-conversion devices. FIG. 7 shows an electric guitar equipped with an electronic-device interface and interconnected to a computer using an enhanced electric-instrument cable that represents one embodiment of the present invention. In FIG. 7, an electric guitar 702 equipped with an electronic-device interface is interconnected to a computer 704 via an enhanced electric-instrument cable 706. When the electric guitar 702 is interconnected to the computer 704, signals output from an electric-guitar circuit, such as the electric-guitar circuit shown in FIG. 5, are passed through the USB interface (512 in FIG. 5) and the TRRS output jack (514 in FIG. 5) and into the enhanced electric-instrument cable 706. Signals in the enhanced electric-instrument cable 706, in turn, are output from the enhanced electric-instrument cable 706 and input to a USB port 708 in the computer 704.

Figure 8:
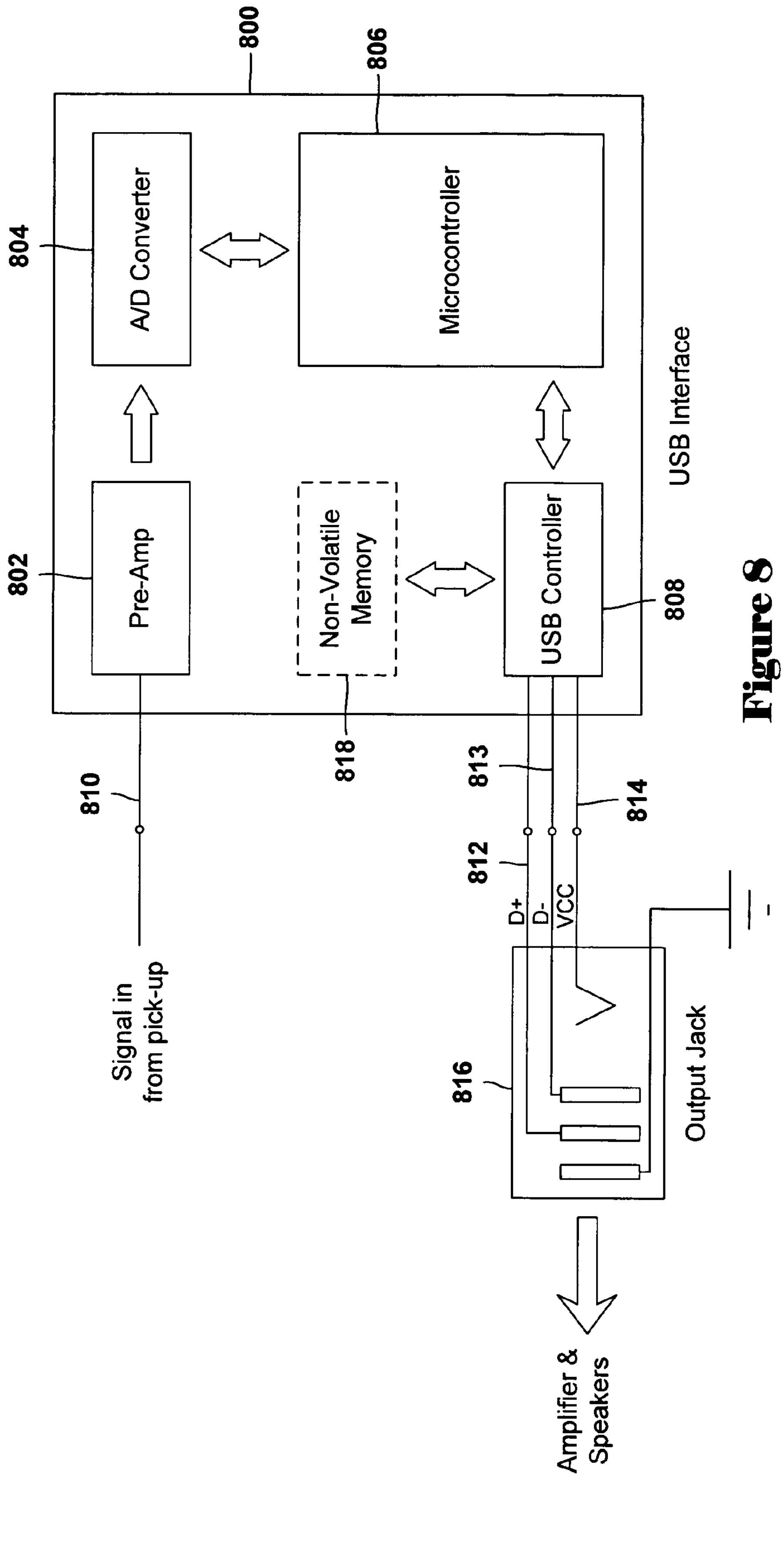
FIG. 8 shows a USB interface for an electric instrument that represents one embodiment of the present invention.

FIG. 8 shows a USB interface for an electric instrument that represents one embodiment of the present invention. A USB interface 800 includes a pre-amp 802, an analog-to-digital ("A/D") converter 804, a microcontroller 806, and a USB controller 808. A signal input to the USB interface on input line 810 is passed through the pre-amp 802, where the input signal is amplified. After the input signal is amplified, the input signal is passed to the A/D converter 804 where the input signal is converted to digital form. The amplified, digital signal is passed to the microcontroller 806 and then to the USB controller 808 where the signal is converted to signals compatible with USB protocols. The USB-compatible signals are output to three data lines 812-814 and passed to a TRRS output jack 816. When the TRRS connection of an enhanced electric-instrument cable is inserted into the TRRS output jack 514, and the USB connection of the enhanced electric-instrument cable is connected to a USB port for an electronic device, the tip connection 516, the first ring connection 518, and the second ring connection 520 pass signals to and from the electronic device via a USB port.

An electronic-device interface may also be used to interface an electric instrument to an electronic device without the need for additional installation sources, such as compact discs. Non-volatile memory 818 can be incorporated into the electronic-device interface 800 and used to store data and/or software. When a USB interface 800 is interconnected to an electronic device, the software stored in the non-volatile memory 818 can perform a number of functions, such as determining whether drivers have been installed in the electronic device that allow the electronic device to recognize and receive information from the electric guitar, and installing such drivers when needed, either manually or automatically. Additionally, software can be stored in the non-volatile memory 818 that determines whether one or more types of specific software have been installed on an interconnected electronic device, such as recording software, management software, and other types of software. Stored software in the non-volatile memory 818 may also be used to prompt a user to install software not detected on the electronic device. Stored data and/or software can also be used to provide a user with instructions, instructional videos, and other types of information. Stored software can be used to install firmware upgrades for an electronic-device interface or other data and/or software in the non-volatile memory.

Figure 10:
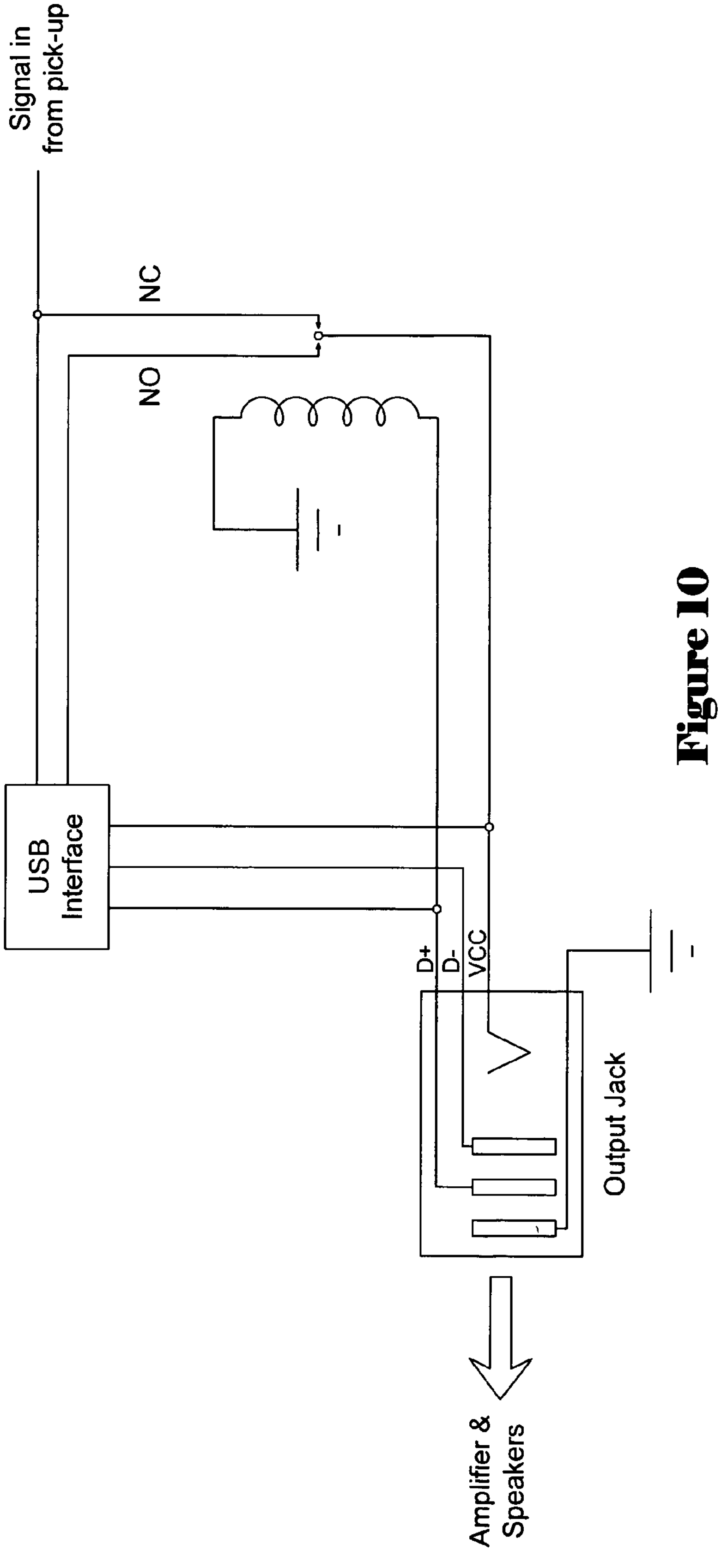
FIG. 10 shows a portion of an electric-instrument circuit containing a bypass for circumventing the USB interface that represents one embodiment of the present invention.

Some electric instruments may include various types of interconnected battery-powered devices. An electronic-device interface can be used for recharging rechargeable batteries for a device interconnected to an electric instrument. FIG. 10 shows a portion of an electric-instrument circuit containing a bypass for circumventing the USB interface that represents one embodiment of the present invention. When a device that uses one or more rechargeable batteries is interconnected to an electric-instrument circuit, the batteries can draw power from an electronic device interconnected to an electronic-device interface via the electronic-device interface. The drawn power can be used to recharge fully or partially depleted rechargeable batteries.

Figure 9:
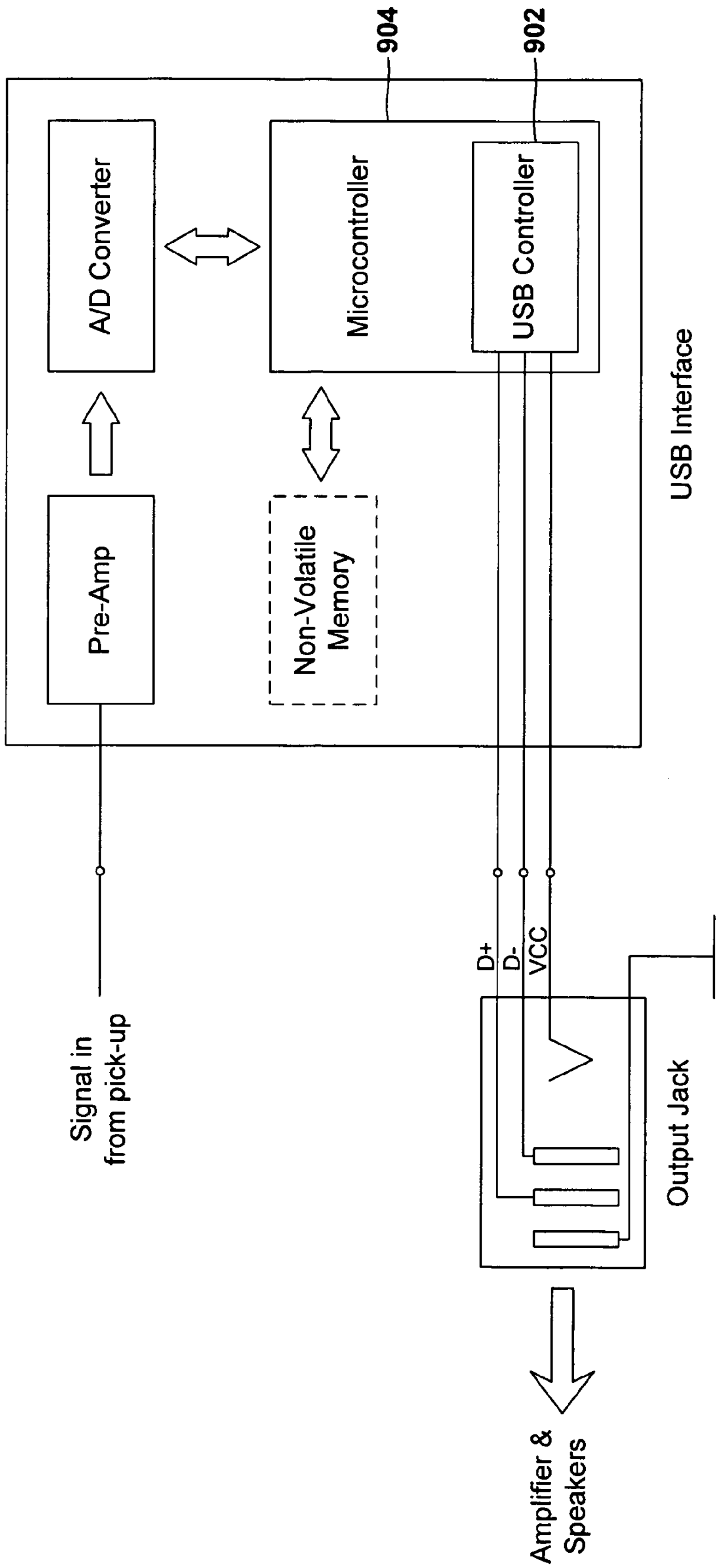
FIG. 9 shows an alternate USB interface for an electric-instrument-connection system that represents one embodiment of the present invention.

Additional modifications within the spirit of the invention will be apparent to those skilled in the art. For example, FIG. 9 shows an alternate USB interface for an electric instrument that represents one embodiment of the present invention. In FIG. 9, a USB controller 902 is incorporated into a microcontroller 904. In alternate embodiments of the present invention, an A/D converter, non-volatile memory, and/or a pre-amp is incorporated into a microcontroller. A USB interface can be positioned inside an electric instrument. Alternatively, a USB interface can be positioned external to an electric instrument.

The foregoing detailed description, for purposes of illustration, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Obviously many modifications and variation are possible in view of the above teachings. The embodiments were chosen and described in order to best explain the principles of the invention and its practical applications and to thereby enable others skilled in the art to best utilize the invention and various embodiments with various modifications as are suited to the particular use contemplated.

The invention claimed is:

1. An electronic-device system for connecting an electric stringed musical instrument to an electronic device, the electronic-device system comprising:

a universal-serial-bus interface interconnected to the electric stringed musical instrument;

a tip-ring-ring-sleeve output jack interconnected to the universal-serial-bus interface; where the tip-ring-ring-sleeve output jack is sized to receive one-quarter-inch cables; and an enhanced electric-stringed-musical-instrument cable with a tip-ring-ring-sleeve connection at a first end that is to be inserted into the tip-ring-ring-sleeve output jack.

2. The electronic-device system of claim 1 wherein the universal-serial-bus interface includes a pre-amp to amplify input signals.

3. The electronic-device system of claim 1 wherein the universal-serial-bus interface includes an analog-to-digital converter to convert input signals to digital form.

4. The electronic-device system of claim 1 wherein the universal-serial-bus interface includes a microcontroller to control the operation of the electronic-device interface.

5. The electronic-device system of claim 1 wherein the universal-serial-bus interface includes a universal-serial-bus controller interconnected to the tip-ring-ring-sleeve output jack.

6. The electronic-device system of claim 1 wherein the universal-serial-bus interface includes non-volatile memory for storing one or more of software, and data.

7. The electronic-device system of claim 6 wherein the software stored in the non-volatile memory includes one or more of software for determining whether drivers have been installed on the electronic device, software for installing drivers on the electronic device, software for determining whether one or more specific pieces of software has been installed on the electronic device, software for determining whether one or more specific classes of software has been installed on the electronic device, software for sending a prompt to install software not detected on the electronic device, software for installing firmware upgrades for the electronic-device system and installed data and software, and software for executing instruction-related materials.

8. The electronic-device system of claim 7 wherein the software for determining whether drivers have been installed on the electronic device executes automatically.

9. The electronic-device system of claim 1 wherein the tip-ring-ring-sleeve output jack interconnected to the universal-serial-bus interface is sized to receive one-quarter-inch-gauge electric-instrument cables.

10. The electronic-device system of claim 1 wherein the tip-ring-ring-sleeve output jack interconnected to the universal-serial-bus interface passes one of an analog signal from an electric-guitar circuit when a tip-sleeve electric-stringed-musical-instrument cable is inserted into the tip-ring-ring-sleeve output jack, and a digital signal suitable for input to a universal-serial-bus port for an electronic device when the enhanced electric-stringed-musical-instrument cable is inserted into the tip-ring-ring-sleeve output jack.

11. The electronic-device system of claim 1 wherein the enhanced electric-stringed-musical-instrument cable is one-quarter-inch gauge.

12. The electronic-device system of claim 1 wherein the enhanced electric-stringed-musical-instrument cable includes a universal-serial-bus connection at a second end.

13. An enhanced electric stringed musical instrument system for interfacing with an electronic device, the enhanced electric stringed musical instrument system comprising:

an electric stringed musical instrument;

a universal-serial-bus interface interconnected to the electric stringed musical instrument;

a tip-ring-ring-sleeve output jack interconnected to the universal-serial-bus interface where the tip-ring-ring-sleeve output jack is sized to receive one-quarter-inch cables; and an enhanced electric-stringed-musical-instrument cable with a tip-ring-ring-sleeve connection at a first end that is to be inserted into the tip-ring-ring-sleeve output jack.

14. The enhanced electric stringed musical instrument system of claim 13 wherein the universal-serial-bus interface includes a pre-amp to amplify input signals.

15. The enhanced electric stringed musical instrument system of claim 13 wherein the universal-serial-bus interface includes an analog-to-digital converter to convert input signals to digital form.

16. The enhanced electric stringed musical instrument system of claim 13 wherein the universal-serial-bus interface includes a microcontroller to control the operation of the electronic-device interface.

17. The enhanced electric stringed musical instrument system of claim 13 wherein the universal-serial-bus interface includes a universal-serial-bus controller interconnected to the tip-ring-ring-sleeve output jack.

18. The enhanced electric stringed musical instrument system of claim 13 wherein the universal-serial-bus interface includes non-volatile memory for storing one or more of software, and data.

19. The enhanced electric stringed musical instrument system of claim 13 wherein the tip-ring-ring-sleeve output jack interconnected to the universal-serial-bus interface is sized to receive one-quarter-inch-gauge electric-instrument cables.

20. The enhanced electric stringed musical instrument system of claim 13 wherein the tip-ring-ring-sleeve output jack interconnected to the universal-serial-bus interface passes one of an analog signal from an electric-guitar circuit when a tip-sleeve electric-stringed-musical-instrument cable is inserted into the tip-ring-ring-sleeve output jack, and a digital signal suitable for input to a universal-serial-bus port for an electronic device when the enhanced electric-stringed-musical-instrument cable is inserted into the tip-ring-ring-sleeve output jack.

21. The enhanced electric stringed musical instrument system of claim 13 wherein the enhanced electric-stringed-musical-instrument cable is one-quarter-inch gauge.

22. The enhanced electric stringed musical instrument system of claim 13 wherein the enhanced cable includes a universal-serial-bus connection at a second end.

23. A method for interfacing an electric stringed musical instrument with an electronic device, the method comprising:

providing an electric stringed musical instrument with an electronic-device interface, the electronic-device interface including a universal-serial-bus interface interconnected to the electric stringed musical instrument, a tip-ring-ring-sleeve output jack interconnected to the universal-serial-bus interface, where the tip-ring-ring-sleeve output jack is sized to receive one-quarter-inch cables, and an enhanced electric-stringed-musical-instrument cable with a first end and a second end, the first end containing a tip-ring-ring-sleeve connection;

inserting the first end of the enhanced electric-stringed-musical-instrument cable into the tip-ring-ring-sleeve output jack, and inserting the second end of the enhanced electric-stringed-musical-instrument cable into the electronic device.

24. The method of claim 23 wherein the universal-serial-bus interface includes non-volatile memory for storing one or more of software, and data.

25. The method of claim 23 wherein the enhanced electric-stringed-musical-instrument cable includes a universal-serial-bus connection at the second end.

26. The method of claim 23 wherein the tip-ring-ring-sleeve output jack interconnected to the universal-serial-bus interface is sized to receive one-quarter-inch-gauge electric-instrument cables.

27. The method of claim 23 wherein the enhanced electric-stringed-musical-instrument cable is one-quarter-inch gauge.

* * * * *